US008327420B2

(12) United States Patent
Chiruvolu

(10) Patent No.: US 8,327,420 B2
(45) Date of Patent: Dec. 4, 2012

(54) AUTHENTICATION SYSTEM AND METHOD

(76) Inventor: Girish Chiruvolu, Plano, TX (US)

(*) Notice: Subject to any disclaimer, the term of this patent is extended or adjusted under 35 U.S.C. 154(b) by 875 days.

(21) Appl. No.: 12/387,992

(22) Filed: May 11, 2009

(65) Prior Publication Data

US 2010/0218240 A1 Aug. 26, 2010
US 2011/0314524 A9 Dec. 22, 2011

Related U.S. Application Data

(63) Continuation-in-part of application No. 11/876,006, filed on Oct. 22, 2007, now Pat. No. 8,112,817.

(60) Provisional application No. 60/855,179, filed on Oct. 30, 2006, provisional application No. 60/928,793, filed on May 11, 2007, provisional application No. 60/928,794, filed on May 11, 2007, provisional application No. 61/127,323, filed on May 12, 2008, provisional application No. 61/128,800, filed on May 23, 2008.

(51) Int. Cl.
H04L 29/06 (2006.01)
(52) U.S. Cl. ............ 726/4; 726/2; 726/3; 713/182
(58) Field of Classification Search ............ 726/4, 2, 726/3; 713/182
See application file for complete search history.

(56) References Cited

U.S. PATENT DOCUMENTS

| | | | | |
|---|---|---|---|---|
| 7,093,291 | B2* | 8/2006 | Bailey | 726/23 |
| 7,143,440 | B2* | 11/2006 | Ginzberg | 726/18 |
| 7,174,462 | B2* | 2/2007 | Pering et al. | 713/182 |
| 7,552,330 | B2* | 6/2009 | Kokumai | 713/169 |
| 7,725,712 | B2* | 5/2010 | Ginzburg et al. | 713/159 |
| 7,966,664 | B2* | 6/2011 | Makkinejad | 726/26 |
| 2003/0145224 | A1* | 7/2003 | Bailey | 713/201 |
| 2004/0030934 | A1* | 2/2004 | Mizoguchi et al. | 713/202 |
| 2004/0093527 | A1* | 5/2004 | Pering et al. | 713/202 |
| 2004/0230843 | A1* | 11/2004 | Jansen | 713/202 |
| 2005/0114675 | A1* | 5/2005 | Ginzburg | 713/182 |
| 2006/0200855 | A1 | 9/2006 | Willis | |
| 2006/0230435 | A1* | 10/2006 | Kokumai | 726/4 |
| 2007/0162745 | A1 | 7/2007 | Ginzburg et al. | |
| 2007/0277235 | A1* | 11/2007 | Barrett et al. | 726/12 |
| 2009/0293119 | A1* | 11/2009 | Jonsson | 726/19 |
| 2011/0138446 | A1* | 6/2011 | Barrett et al. | 726/3 |

FOREIGN PATENT DOCUMENTS

WO WO 00/65424 * 11/2000

* cited by examiner

Primary Examiner — Edan Orgad
Assistant Examiner — Bradley Holder
(74) Attorney, Agent, or Firm — Michael Diaz

(57) ABSTRACT

An authentication system includes one or more terminals in communication with a server on a network. The server is operable to receive user login information; and generate an authentication data set having: a plurality of decoy data; an anchor data, wherein the anchor data is based on information from a user profile; and target data in a predetermined relationship relative to the anchor data. The server is also operable to generate a decoy data set having: a plurality of second decoy data; and at least one anchor data. The server may then display the authentication data set and decoy data set and determine an authentication result by performing a predetermined manipulation of the target data. The server may receive a user response to an authentication prompt; and authenticate the user if the authentication result and user response are the same.

19 Claims, 6 Drawing Sheets

AUTHENTICATION SYSTEM AND METHOD

This application is a continuation-in-part application of U.S. patent application Ser. No. 11/876,006 entitled "USER-CENTRIC AUTHENTICATION SYSTEM AND METHOD" filed on Oct. 22, 2007 now U.S. Pat. No. 8,112,817 under the names of Girish Chiruvolu and Arpitha Chiruvolu which claims the priority date of U.S. Provisional Patent Application Ser. No. 60/855,179 by Arpitha Chiruvolu filed Oct. 30, 2006, U.S. Provisional Patent Application Ser. No. 60/928,793 by Girish Chiruvolu filed May 11, 2007, and U.S. Provisional Patent Application Ser. No. 60/928,794 by Girish Chiruvolu filed May 11, 2007. In addition, this Non-Provisional Application claims the benefit of U.S. Provisional Application Ser. No. 61/127,323 by Girish Chiruvolu and filed May 12, 2008, which is incorporated by reference herein in its entirety, and U.S. Provisional Application Ser. No. 61/128,800 by Girish Chiruvolu and filed May 23, 2008, which is incorporated by reference herein in its entirety.

FIELD OF THE INVENTION

This invention relates to authentication systems and methods. Specifically, and not by way of limitation, the present invention relates to user-centric systems and methods of authentication employing decoy data.

BACKGROUND

Security and privacy of online data and services are of utmost concern to most consumers utilizing the Internet or other electronic communication means (collectively online communications). There have been many systems and methods employed to provide security and privacy to the users of online communications. Authentications systems are often used to authenticate and verify the identity of a user attempting to access online stored data.

One such authentication system involves the use of simple password-based authentication/authorization methodologies. The sensitive data protected by this existing authentication system is clearly at risk if the password is determined or the user leaves his communication device open such that unauthorized persons can access or view the stored data. Saved passwords have often led to unauthorized individuals accessing or modifying stored data. A primary disadvantage of passwords is that they must be memorized. These passwords often have to be changed and many times require the use of special characters (e.g., symbols other than alphanumeric characters) which are hard to keep track of by a user.

In another existing authentication system, biometrics is used, which leverages unique characteristics that are attributed to the user to authenticate the user. Biometrics also has several disadvantages. First, specialized, and often expensive, equipment is required to read the users measured physical characteristics. Second, the measuring by the equipment often results in erroneous readings. Additionally, there are various challenges in order for biometric authentication to be viable and non-intrusive in day to day operations. Biometric authentication systems are also subject to spoofing and false classification of biometric readings.

In another existing authentication system, often in conjunction with a password authentication system, is the use of hard tokens. The hard tokens act as a key to access the sensitive online data. However, the user must keep possession of the hard token, which can easily be lost.

Current existing authentication systems merely use a one-time login with occasional screen locks due to inactivity, which requires the re-entry of the password. Even in the case where the user is periodically prompted to change the password, a static password is oftentimes saved in the user environment, which allows another unauthorized person to overcome the password authentication. Moreover, trojans (unauthorized and unnoticed processes that are classified as malware or man-in-the-middle) can steal/collect the history of the passwords and can initiate unauthorized transactions or alter transactions in real time.

Thus, there is a significant need authentication systems and methods that are more robust and less susceptible to theft and unauthorized use.

DESCRIPTION OF THE DRAWINGS

The drawings, when considered in connection with the following description, are presented for the purpose of facilitating an understanding of the subject matter sought to be protected.

FIG. 3b illustrates the authentication data set of FIG. 3a.

DETAILED DESCRIPTION

Figure 1:
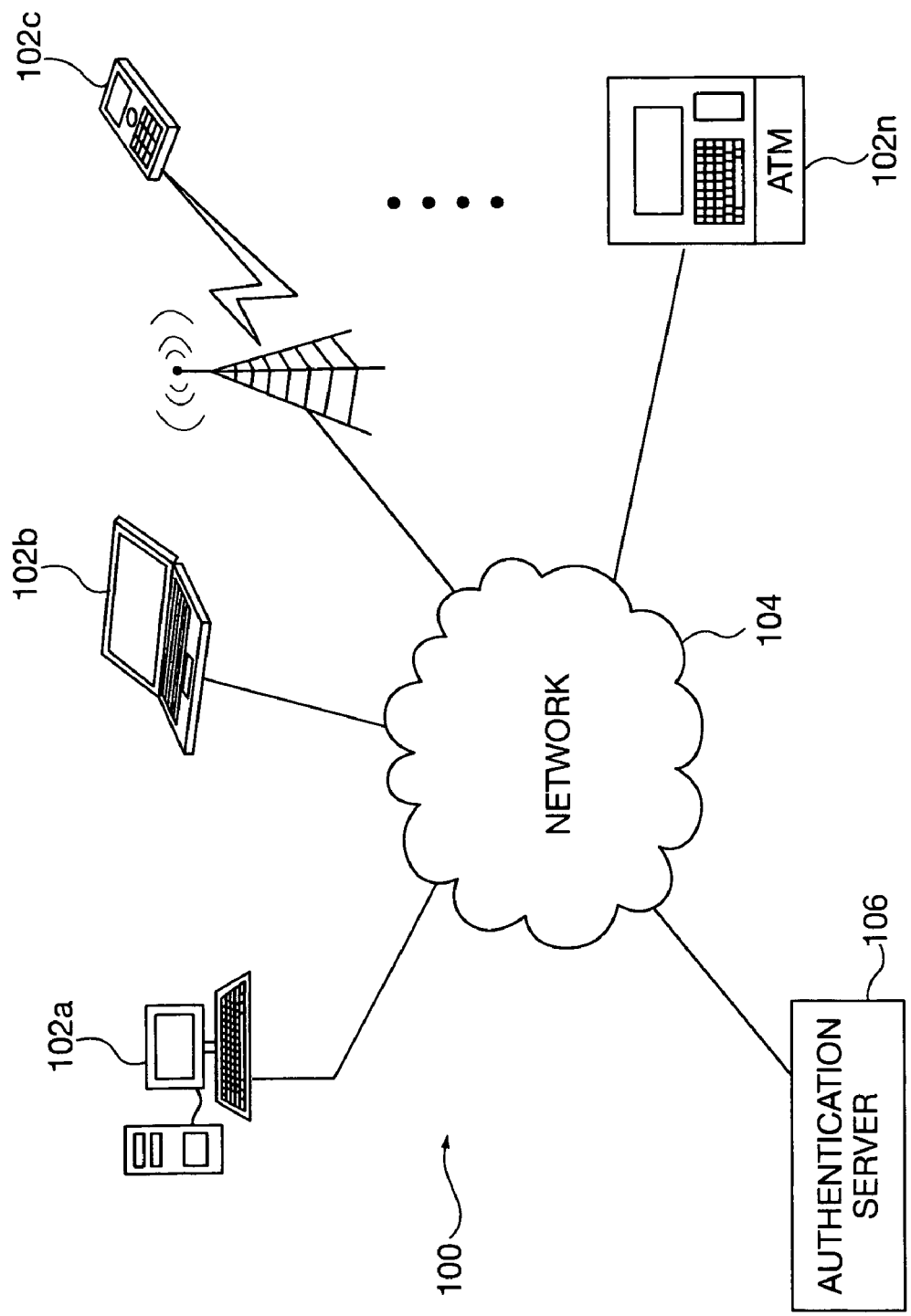
FIG. 1 illustrates an authentication system.

Referring now to FIG. 1, an authentication system 100 for authenticating a user is shown. The authentication system 100 generally includes one or more terminals 102a-102n (collectively 102), a communications network 104, and a server 106. The different elements and components of the system 100 may communicate with one another using wireless communications or hardwired connections, such as fiber optics, cable, DSL, telephone lines, and other similar connections.

The terminals 102 may include any suitable device operable to act as a client on a network. Illustrative terminals 102 include, but are not limited to, personal computers, desktop computers, laptop computers, servers, automatic teller machines (ATMs) or any suitable telecommunications device, including, but not limited to, VoIP telephones, smart telephones or wireless devices, such as cellular telephones, personal digital assistants (PDAs), communications enabled mp3 players, etc. Each terminal 102 may be configured to transmit and/or receive information to and/or from the server 106.

The communications network 104 may include any number of networks capable of providing communications between the server 106 and terminals 102. For example, the communications network may be one or more, or any combination of, wireless networks, data or packet networks, publicly switched telephone networks (PSTN), etc.

The server 106 may be any server, computer or device configured to process commands from the terminals 102. In one embodiment, the server includes memory for storing a set of instructions and a processor for executing the instructions. The processor may access information from, and store information in a nonremovable memory, a removable memory, or a combination thereof, also collectively referred to herein as computer readable media. Illustrative nonremovable memory may consist of RAM, ROM, a hard disk, or other well-known memory storage technologies. Illustrative removable memory may consist of one or more Subscriber Identity Module (SIM) cards, or other well-known memory storage technologies, such as "smart cards," magnetic disks, floppy disks, optical disks, magneto-optical disks, magnetic tapes, or any suitable non-volatile memory. As will be discussed further below, the set of instructions executed by the server 106 permit the server 106 to authenticate a user or a user-generated event based on input received from a user at a terminal 102, as well as any other suitable function.

Figure 2:
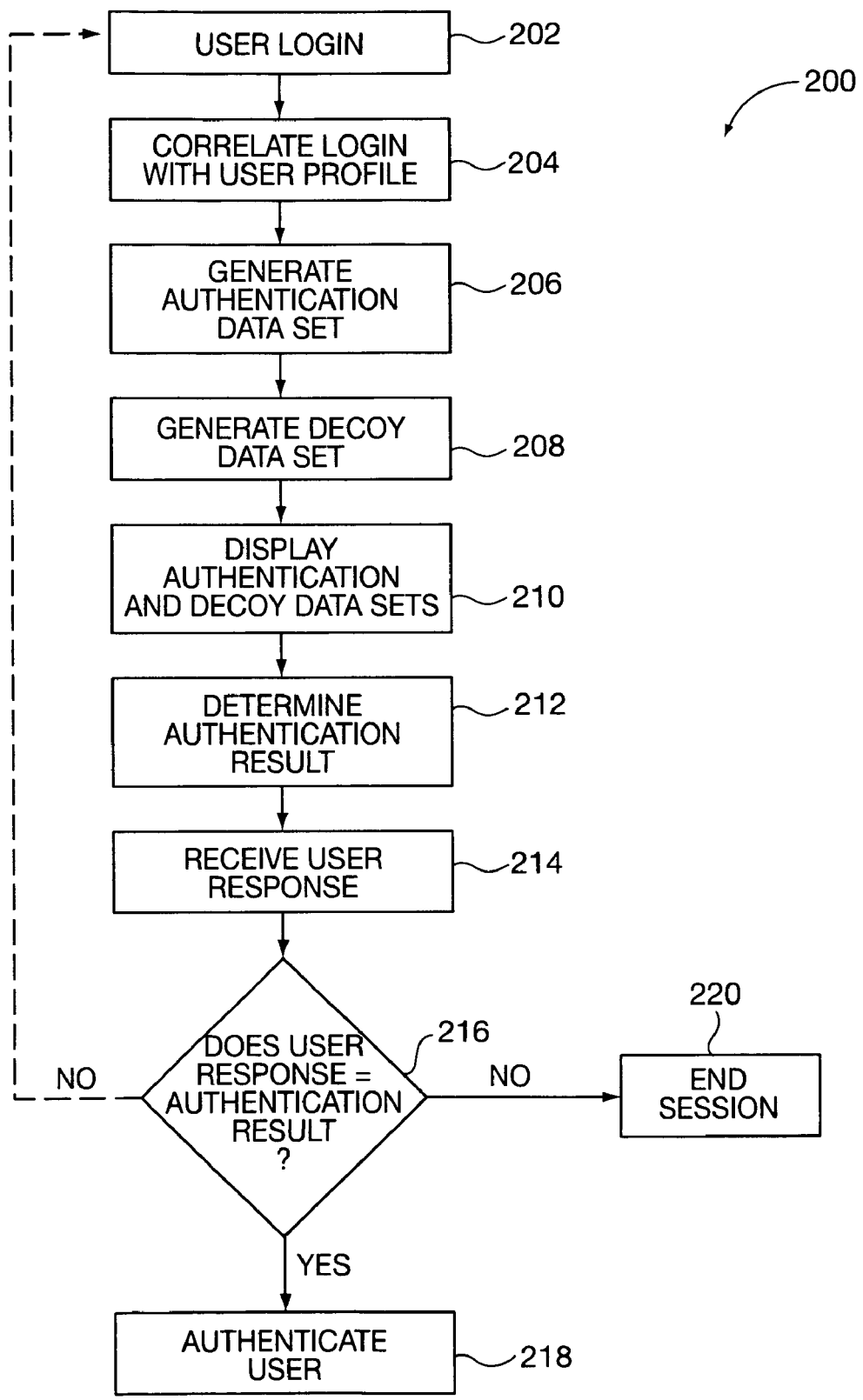
FIG. 2 illustrates a flow diagram of a process for authenticating a user.

Referring now to FIG. 2, a flow diagram of an authentication process 200 is shown. In one embodiment, the process 200 is performed by a server, such as a server 106 shown and described relative to FIG. 1; however, it will be appreciated that the process may be implemented by a server, wireless device, VoIP telephone, other advanced intelligence network device, or any combination thereof, generally referred to herein as the "device."

The process begins with a user logging into the device (step 202). The user may log into the device via any suitable device or terminal. The user's login information may include a screen name, nickname or any other suitable identifying criteria. In one embodiment, the user's login information may correspond with a previously created user profile. The user profile may include, but is not limited to, the user's login information, other user identifying information, and/or, as will be discussed further below, predetermined manipulation rules or algorithms for calculating an authentication result, anchor data, rules for generating authentication data set(s), rules for generating decoy data set(s), predetermined relationship(s) for target data relative to anchor data, or any other suitable information or data. The user profile may be established by any suitable method, process or technique. In one embodiment, the user profile is established prior to a subsequent user login event (e.g., step 202) in accordance with U.S. patent application Ser. No. 11/876,006, "User-Centric Authentication System and Method," which is expressly incorporated by reference herein in its entirety. Once the system has received the user login information, the device may correlate the user login information with a corresponding user profile (step 204).

Next, the device generates an authentication data set (step 206). The authentication data set includes, but is not limited to, a plurality of decoy data, anchor data, and target data. The term "data", as used throughout, refers to any suitable information conveying device, information or method. For example, suitable data may include, but is not limited to, one or more: alphanumeric characters, symbols, digital images, digital audio files, digital video files, foreign language characters (e.g., Chinese, Japanese, Arabic, etc.), or any combination thereof. Therefore, it will be appreciated that, while the forthcoming examples employ alphanumeric characters and symbols, any other suitable data may be employed and remain within the scope of the present disclosure. FIG. 3b shows an illustrative embodiment of an authentication data set 304 having decoy data 306, anchor data 308 and target data 310.

In one embodiment, information for the anchor data may be stored as part of, and retrieved from, the user profile. For example, as will be discussed further below, in the illustrative embodiment of FIGS. 3a and 3b, the "@" symbol is employed as the anchor data 308, and each time a user logs in into the device, the "@" symbol is the anchor data in the authentication data set. In one embodiment, the decoy data and target data may be randomly generated by the device. The target data may be data that the user identifies with the assistance of the anchor data. The target data may be data in a predetermined relationship to the anchor data. The predetermined relationship may be based on information from the user profile and previously agreed to, or assigned to, the user in previously establishing the user profile. In one embodiment, the predetermined relationship between the anchor data and the target data may be the same for each login or user-generated event. Any suitable relationship between the target data and anchor data may be employed. For example, in the illustrative embodiment of FIG. 3b, the target data 310 is right-adjacent to the anchor data 308; however, it will be appreciated that any suitable relationship may be employed. For example, the target data may be left-adjacent to the anchor data, above the anchor data, below the anchor data, offset from the anchor data, in a diagonal relationship to the anchor data, or at any other suitable position or relationship relative to the anchor data. In one embodiment, the anchor data and the target data are randomly positioned among the plurality of decoy data such that the anchor data and target data are positioned differently among the decoy data for each generated authentication data set. In one embodiment, the user employs the target data as a, or a part of a, response to an authentication prompt. As will be discussed further below, the user may manipulate the target data in accordance with a predetermined manipulation rule or algorithm previously agreed to by, or previously assigned to, the user and stored in the user profile, whereby the manipulated target data is employed as a, or part of a, response to an authentication prompt.

Referring again to FIG. 2, once the authentication data set has been generated, a decoy data set may then be generated (step 208). In one embodiment, a plurality of decoy data sets are generated. Each decoy data set may include a plurality of decoy data. In an alternative embodiment, in addition to the plurality of decoy data, the decoy data set may also include anchor data. In one embodiment, the anchor data is based on information from the user profile. In an alternative embodiment, the anchor data in the decoy data set in substantially similar to, or the same as, the anchor data in the authentication data set.

Once the authentication data set and decoy data set have been generated, the authentication data set and the decoy data set are displayed at or on at least one terminal for the user to view (step 210). In one embodiment, the data sets are embedded in a digital image such that third-party tampering with the data sets is challenging. Also, as will be discussed below, the authentication data set and decoy data set may be displayed in such a manner to assist a user in differentiating between each decoy data set and the authentication data set.

Figure 3A:
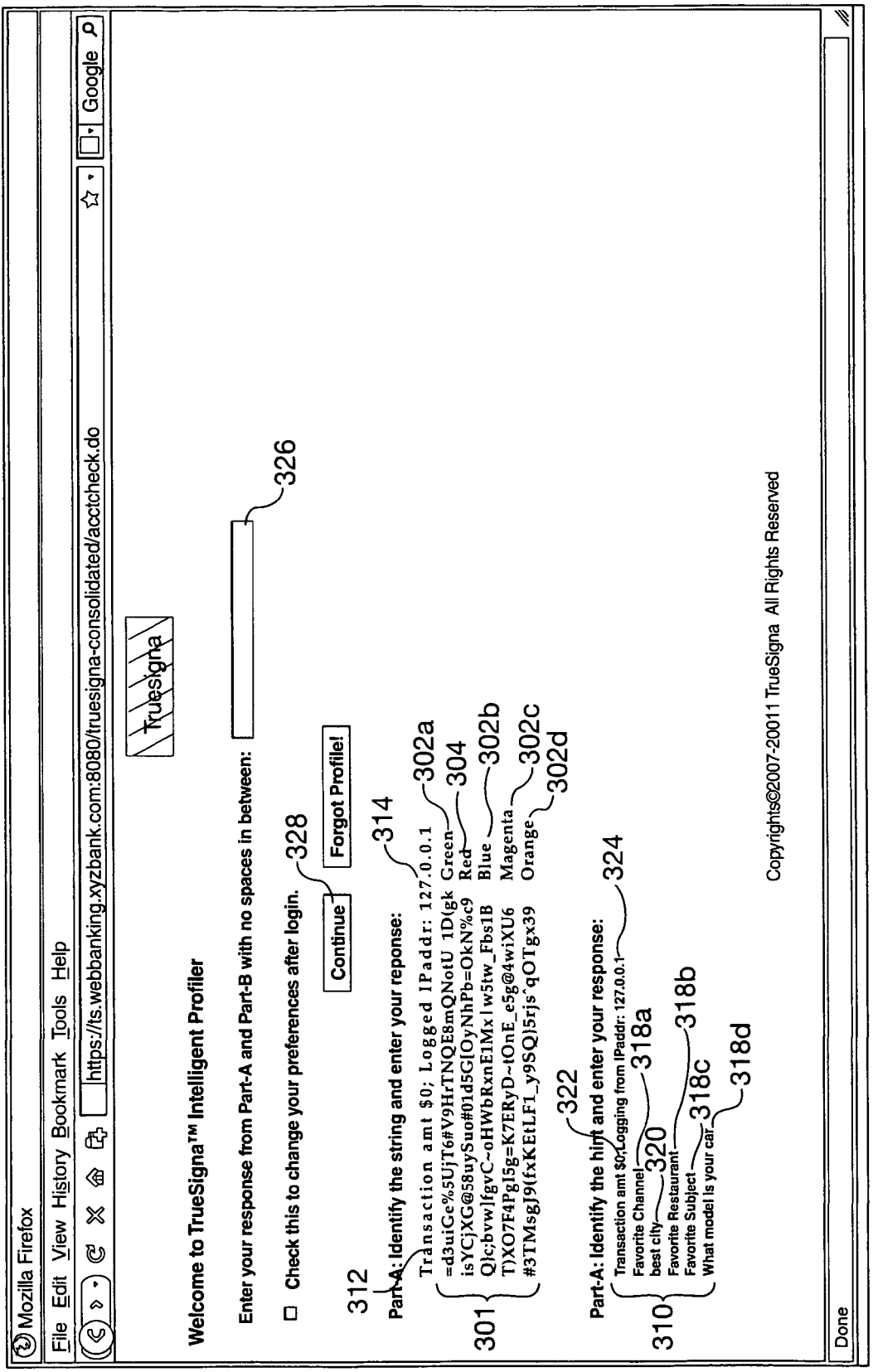
FIG. 3a illustrates a display screen having authentication data sets and decoy data sets.
Figure 3B:
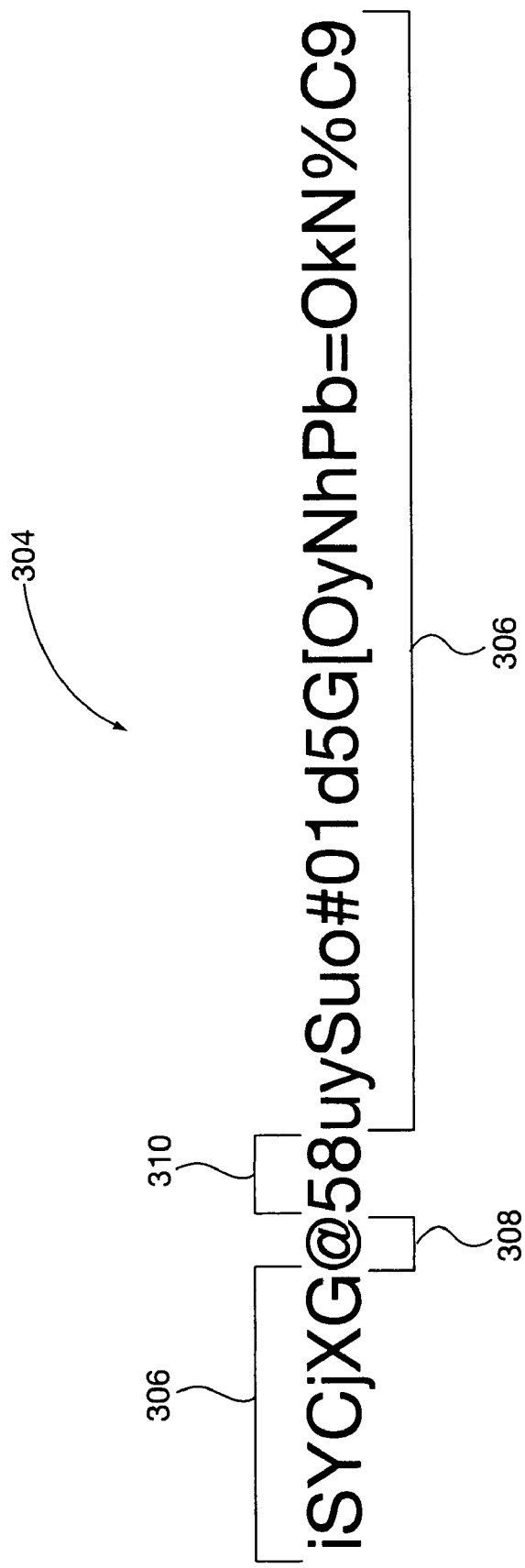

Referring now to FIGS. 3a and 3b, an illustrative screenshot 300 of a display of the authentication data set 304 and decoy data sets 302a-302d (collectively 302) is shown. While the illustrative embodiment shows four decoy data sets, it will be appreciated that any suitable number of decoy data sets may be employed. Also, in the illustrative embodiment, the authentication data set 304 and decoy data sets 302 are displayed in a group 301; however, it will be appreciated that the authentication data set 304 and decoy data sets 302 may be displayed in any suitable manner or relationship relative to one another. In one embodiment, the order of data sets 302, 304 is randomized each time the user logs in or for each user-generated event such that the authentication data set 304 is not in the same location relative to the decoy data sets 304 each time the data sets 302, 304 are displayed.

Also, as previously mentioned, the authentication data set 304 and decoy data sets 302 may be displayed in such a manner that the user may differentiate between the decoy data sets 302 and the authentication data set 304. In the illustrative embodiment, the authentication data set 304 is displayed in a predetermined color where the predetermined color is based on information from the user profile and previously agreed to, or assigned to, the user in previously establishing the user profile. Therefore, despite the location of the authentication data set 304 relative to the decoy data sets 302, the user may be able to identify the authentication data set 304 by identifying the data set displayed in the predetermined color (e.g., red). The decoy data sets 302 may likewise be displayed in different decoy colors; in other words, colors different than the color of the authentication data set 304. In one embodiment, each decoy color is based on information from the user profile. In one embodiment, the same decoy colors are employed for the decoy data sets 304 for each login or user-generated event. While the illustrative embodiment employs displaying the authentication data set 304 in a predetermined color to indicate for the user which data set is the authentication data set 304, as well as displaying the decoy data sets 302 in decoy colors, it will be appreciated that any suitable scheme or method for differentiating the authentication data set 304 from the decoy data sets 302 for the user may be employed. For example, predetermined name(s), line number (s), image(s), digital audio, digital video, or any other suitable scheme, device or method may be employed to assist in identifying the authentication data set for the user. Similarly, any suitable decoy device, scheme or method may be employed to enhance the decoy data sets 302 and obfuscate their decoy nature for anyone other than a bona fide user; for example, suitable decoy devices, schemes, or methods may correspond in kind to those employed to identify the authentication data set and may include, without limitation, predetermined name(s), line number(s), image(s), digital audio, and digital video. In an alternative embodiment, a position-based index may be employed. In this arrangement, a short numerical string may be displayed along with a listing of authentication data set and decoy data sets. The user selects the number in the predetermined position in the numerical string. The predetermined position may be established for the user when establishing the user profile. The number in the predetermined position in the numerical string indicates for the user which position in the listing of data sets is the authentication data set. For example, the numerical string may be "2112" and the predetermined position for the user may be the last number in the numerical string. Therefore, in this example, the user will be notified that the second data set in the data set listing is the authentication data set because the last number in the illustrative string is 2. The numbers of the numerical string and position of the authentication data set may be randomized and/or changed for each user login or user-generated event such that the location of the authentication data set in a data set listing is not necessarily always the same. Also, along with displaying the data sets, the device may also display any suitable confirmation data 312, 314, including, but not limited to, transaction information, IP address information, user name, etc. Also, a text entry field 326, confirmation button(s) 328, etc. may also be displayed.

Referring again to FIG. 2, the device may determine an authentication result based on information from the user profile (step 212). In one embodiment, the authentication result is determined by performing a predetermined manipulation of the target data. In one embodiment, the predetermined manipulation is based on information from the user profile and previously agreed to, or assigned to, the user in previously establishing the user profile. For example, a predetermined manipulation may include transposing two or more characters of the target data, performing a mathematical function on the target data, adding information or data to the target data, deleting information or data from the target data, or any other suitable manipulation. Other suitable predetermined manipulations may include those described in U.S. patent application Ser. No. 11/876,006, which are incorporated herein by reference. In an alternative embodiment, the authentication result may be a simple confirmation of information displayed to the user (e.g., the authentication result is a click on an "OK" button, etc.).

Once the authentication result has been determined, a user response to an authentication prompt may be received (step 214). In one embodiment, a correct user response is generated by the user performing the exact predetermined manipulation to the target data as that of step 212 and transmitting the result to the device. Alternatively, the authentication result may be a simple confirmation of information displayed to the user (e.g., the authentication result is a click on an "OK" button, etc.). Next, the device compares the authentication result and user response (step 216). If the user response and authentication result are the same, the device may authenticate the user, complete the user-generated event or transaction, etc. (step 218). However, if the user response and authentication result are not the same, the device may end the session (step 220). Alternatively, if the user response and authentication result are not the same, the device may prompt the use to login again (step 202), may generate a second authentication data set (step 206) and a second decoy data set (step 208), prompt the user to enter the user response again (step 214), or take any other suitable action.

Referring again to FIGS. 3*a* and 3*b*, in addition to the previously described process employing an authentication data set 304 and decoy data sets 302, the device may optionally employ an authentication query set 316. The authentication query set 316 may include a plurality of decoy queries 318*a*-318*d* (collectively 318) and a predetermined target query 320. The queries 318, 320 may be based on information from the user profile, and, in particular, the target query 320 and appropriate response thereto may be based on information from the user profile and previously agreed to, or assigned to, the user in previously establishing the user profile. In one embodiment, the target query 320 and decoy queries 318 are the same for each login or user-generated event, yet their display to the user may be randomized so they are not in the same particular order or location for each login or event confirmation. In one embodiment, a correct user response to the target query 320 (e.g., Plano) may form at least a part of a correct user response to an authentication prompt.

In one non-limiting example employing both the data set grouping 301 and authentication query set 316 and taken from the user perspective, the predetermined authentication data set color may be red, the predetermined anchor data may be the "@" symbol, the predetermined relationship of the target data to the anchor data is two characters right-adjacent to the anchor data, the predetermined manipulation may be transposing the target data, and the predetermined target query may be "best city" with the correct response being "Plano". Once the screen 300 is displayed to the user, the user may identify the authentication data set 304 based on the authentication data set color, i.e., red. Next, the user may locate anchor data 308, i.e., the "@" symbol and determine that the target data 310 is "58" for this session based on the rules established when the user profile was established, i.e., the target data is two characters right-adjacent to the anchor data. Next, the user may transpose the target data and enter the result as part of the response, i.e., "85". Next, the user locates the target query 320, i.e., "best city" and enters the predetermined answer as the second part of the response, i.e., "Piano". Thus, in this example, the authentication result and correct user response thereto is "85Plano". It will, however, be appreciated that merely one of the authentication data set (with corresponding decoy data set(s)) and authentication query set may be employed and remain within the scope of the present disclosure.

Referring now to FIG. 3, a flow diagram of a second authentication process 400 is shown. In one embodiment, the process 400 is performed by a server, such as a server 106 shown and described relative to FIG. 1; however, it will be appreciated that the process may be implemented by a server, wireless device, VoIP telephone, other advanced intelligence network device, or any combination thereof, generally referred to herein as the "device."

The device generates an event confirmation data set in response to a user-generated event (step 402). In one embodiment, the confirmation data set includes a plurality of decoy data and at least one target data. In one embodiment, the target data is associated with the user-generated event. For example, the target data may be a dollar amount involved in a financial transaction, a prescription number for an electronic prescription fill/re-fill, an e-mail address of an intended e-mail recipient, etc. It will, however, be appreciated that the target data may be associated with any suitable user-generated event and the present disclosure is not limited in any way to the forgoing examples. In one embodiment, the type of target data associated with the user-generated event may be prior agreed to, or prior assigned to, the user in establishing the user profile. Thus, while the exact information (e.g., the actual dollar amount) encompassed in the target data may change from user-generated event to user-generated event, the target data to be identified by the user during each authentication may remain constant (e.g., an amount involved in a given transaction). In an alternative embodiment, the event confirmation data set may include anchor data and operate similarly to the previous examples involving the use of anchor data for locating target data.

Once the event confirmation data set has been generated, the event confirmation data set may be displayed (step 404). In one embodiment, the event confirmation set is embedded in a digital image such that third-party tampering with the data sets is challenging. Alternatively, the event confirmation data set may be embedded in a digital watermark associated with a digital image. Additionally, in one embodiment, the authentication data set may be displayed in several locations on a screen. Moreover, the authentication data set may be displayed at various or random angles. Further, the authentication data set may be displayed among any suitable number or type of other decoy data It will be appreciated that the forgoing illustrative techniques for displaying the authentication data set are illustrative only and not limiting in any fashion.

Figure 5:
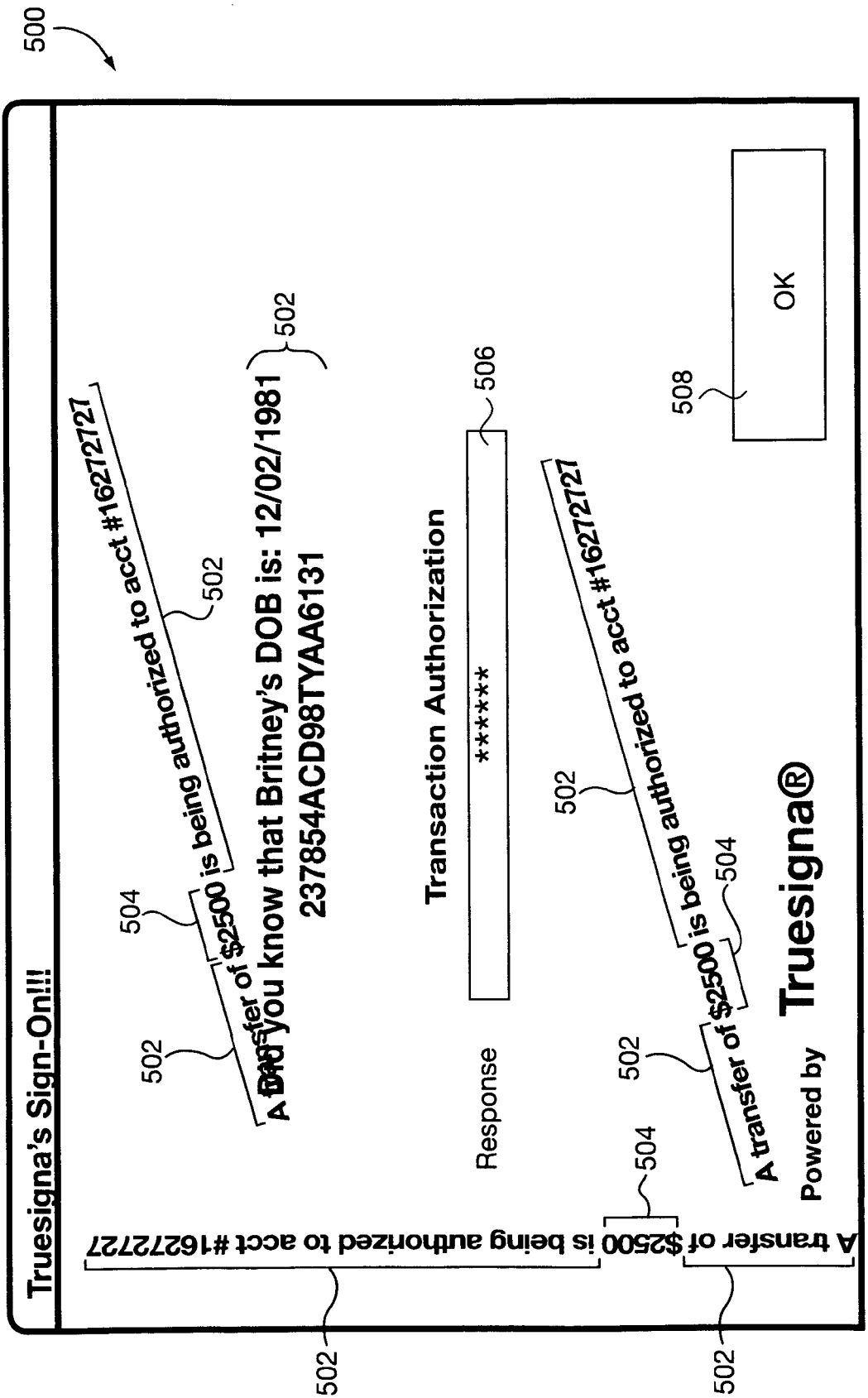
FIG. 5 illustrates a display screen having an event confirmation data set.

Referring now to FIG. 5, an illustrative screen-shot 500 of a display of an event confirmation data set is shown. As previously mentioned, the confirmation data set includes a plurality of decoy data 502 and at least one target data 504 associated with the user-generated event. In the illustrative embodiment, the target data 504 is displayed in multiple locations and at various angles. In addition, the data set(s) are embedded in an digital image to deter undesired third-party participation, such as that by a hacker, man-in-the-middle, etc. The display may also include a text entry field 506, confirmation button(s) 508, or any other suitable information or fields.

Referring again to FIG. 4, the device may determine an authentication result based on information from the user profile (step 406). In one embodiment, the authentication result is determined by performing a predetermined manipulation of the target data. In one embodiment, the predetermined manipulation is based on information from the user profile and previously agreed to, or assigned to, the user in previously establishing the user profile. For example, a predetermined manipulation may include transposing two or more characters of the target data, performing a mathematical function on the target data, adding information or data to the target data, deleting information or data from the target data, or any other suitable manipulation. Other suitable predetermined manipulations may include those described in U.S. patent application Ser. No. 11/876,006, which are incorporated herein by reference. In an alternative embodiment, the authentication result may be a simple confirmation of information displayed to the user (e.g., the authentication result is a click on an "OK" button, etc.).

Once the authentication result has been determined, a user response to an authentication prompt may be received (step 408). In one embodiment, a correct user response is generated by the user performing the exact predetermined manipulation to the target data as that of step 406 and transmitting the result to the device. Alternatively, the authentication result may be a simple confirmation of information displayed to the user (e.g., the authentication result is a click on an "OK" button, etc.). Next, the device compares the authentication result and user response (step 410). If the user response and authentication result are the same, the device may authenticate the user, complete the user-generated event or transaction, etc. (step 412). However, if the user response and authentication result are not the same, the device may end the session (step 414). Alternatively, if the user response and authentication result are not the same, the device may generate a second event confirmation data set (step 402), prompt the user to enter the user response again (step 408), or take any other suitable action.

Figure 4:
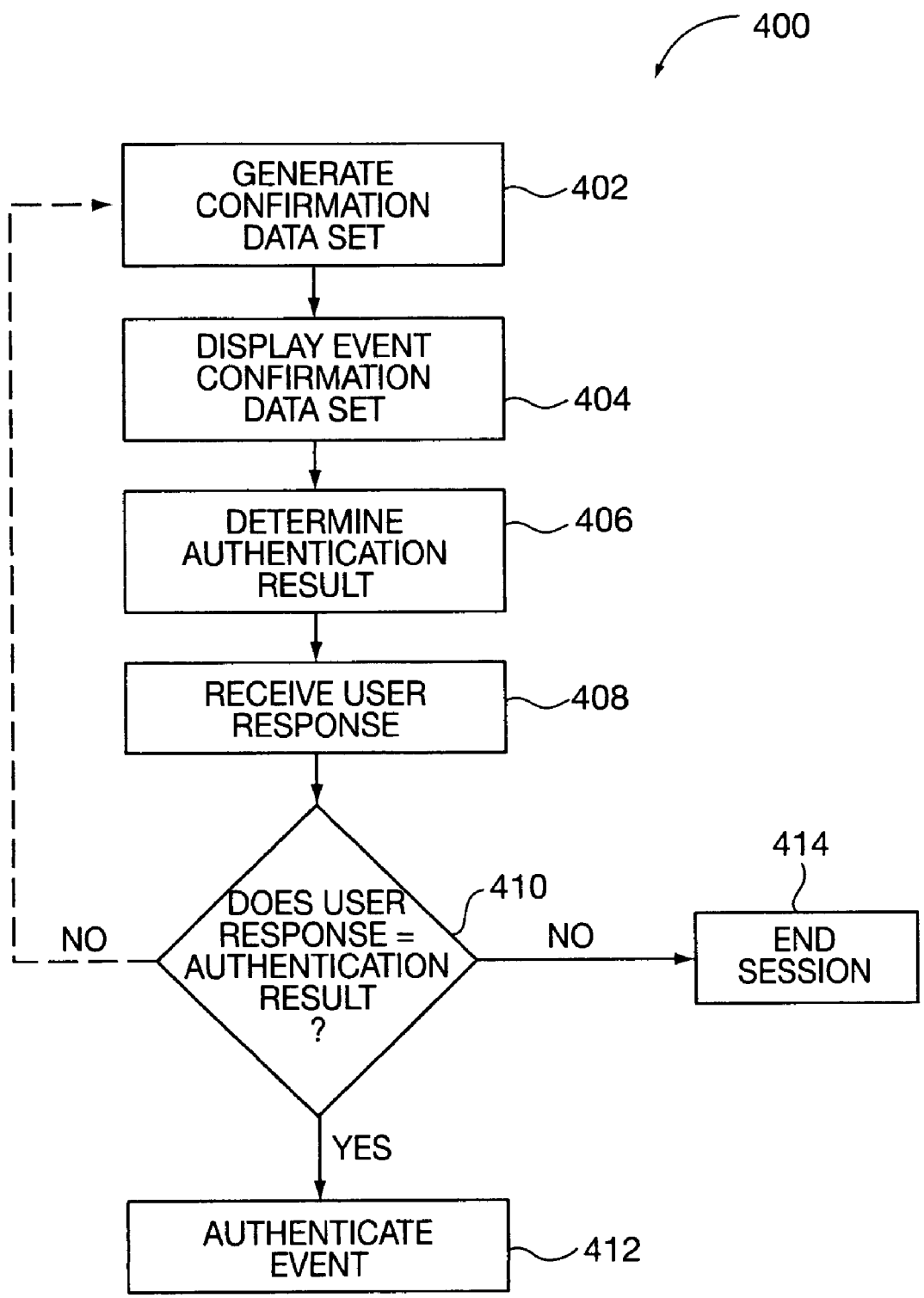
FIG. 4 illustrates a flow diagram of a process for authenticating a user-generated event.

Referring again to FIG. 5, a non-limiting example of the process of FIG. 4 taken from the user perspective will be discussed. In this example, the predetermined target data type may be the dollar amount of the transaction and the predetermined manipulation may be adding "32" to the dollar amount of the transaction. The predetermined target data type and predetermined manipulation may be established when the user profile is initially created and agreed to, or assigned to, the user therewhile. Once the screen 500 is displayed to the user (with both the target data 504 and decoy data 502), the user may identify the target data 504, e.g., "2500", based on the previously established rules. Next, the user may add "32" to the target data and enter the result as the, or as part of the, response, i.e., "2532", in the text entry field 506 and click the OK button 508.

While the present disclosure is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility. Thus, those having ordinary skill in the art and access to the present teachings will recognize additional modifications, applications and embodiments within the scope thereof. It is therefore intended by the appended claims to cover any and all such applications, modifications and embodiments within the scope of the present disclosure and any equivalents thereof.

What is claimed is:

1. An authentication system for authenticating a user, the system comprising:
    one or more participant terminals operable to act as a client on a network;

a computer operable to act as a server on the network and to communicate with each of the participant terminals over the network, the computer comprising:
  a memory configured to store a set of instructions; and
  a processor configured to execute the set of instructions, wherein the set of instructions cause the processor to:
  receive user login information from at least one participant terminal, wherein the user login information corresponds to a user profile;
    generate an authentication data set comprising:
      a plurality of decoy data;
      an anchor data, wherein the anchor data is based on information from the user profile; and
      at least one target data in a predetermined positional relationship relative to the anchor data, wherein the predetermined relationship is based on information from the user profile;
    generate a decoy data set comprising: a plurality of second decoy data; and
      at least one anchor data, wherein the anchor data is based on information from the user profile;
    present the authentication data set and decoy data set on at least one terminal;
    wherein the anchor data and the target data are positioned differently and randomly among the decoy data for each generated authentication data set, the predetermining positional relationship providing information on the identity of the target data in the authentication data set to the user;
  determine an authentication result by performing a predetermined manipulation of the at least one target data, wherein the predetermined manipulation is based on information from the user profile;
  receive a user response to an authentication prompt; and
  compare the authentication result and the user response and authenticating the user if the authentication result and user response are the same;
    wherein, based upon a predetermined event, the set of instructions further cause the processor to generate a second authentication data set, generate an authentication query set, or discontinue a login session with the user;
    wherein generating an authentication query set comprises:
  a plurality of predetermined decoy queries, wherein each of the predetermined decoy queries is based on information from the user profile; and
  at least one predetermined target query, wherein each target query is from the user profile;
    present the authentication query set to at least one terminal;
    determine an authentication result by retrieving a correct response to each target query from the user profile;
    receive a user response to an authentication prompt; and
    compare the authentication result and the user response and authenticating the user if the authentication result and user response are the same;
  wherein the decoy queries and target query are presented in random relationship relative to one another.

2. The authentication system of claim 1 wherein the authentication data set comprises at least two target data.

3. The authentication system of claim 2 wherein the predetermined manipulation includes transposing the at least two target data.

4. The authentication system of claim 2 wherein a correct authentication result is dependent upon an order of the at least two target data results in the authentication data set.

5. The authentication system of claim 1 wherein the predetermined manipulation is a mathematical function.

6. The authentication system of claim 1 wherein at least a portion of the decoy data are alphanumeric characters.

7. The authentication system of claim 1 wherein at least one target data is an alphanumeric character.

8. The authentication system of claim 1 wherein the predetermined relationship of the at least one target data relative to the anchor data is adjacent to the anchor data.

9. The authentication system of claim 1 wherein the instructions further cause the processor to embed the authentication data set in a digital image.

10. The authentication system of claim 1 wherein the instructions cause the processor to indicate for the user which data set is the authentication data set.

11. The authentication system of claim 10 wherein the authentication data set is displayed in a predetermined color, wherein the predetermined color is based on information from the user profile.

12. The authentication system of claim 11 wherein the decoy data set is displayed in a predetermined decoy color, wherein the predetermined decoy color is based on information from the user profile.

13. The authentication system of claim 1 wherein the instructions further cause the processor to embed the authentication query set in a digital image.

14. An authentication system for authenticating a user generated event, the system comprising:
  one or more participant terminals operable to act as a client on a network;
  a computer operable to act as a server on the network and to communicate with each of the participant terminals over the network, the computer comprising:
    a memory configured to store a set of instructions; and
    a processor configured to execute the set of instructions, wherein the set of instructions cause the processor to:
      generate an event confirmation data set in response to a user generated event, the event confirmation data set comprising:
        a plurality of decoy data;
        at least one target data directly related to the event;
        an anchor data, wherein the anchor data is based on information from a user profile, wherein the at least one target data having a predetermined positional relationship to the anchor data and the predetermined relationship is based on information form the user profile;
      present the confirmation data set on at least one terminal; determine an authentication result by performing a predetermined manipulation of the at least one target data, wherein the predetermined manipulation is based on information from a user profile;
      wherein the anchor data and the target data are positioned differently and randomly among the decoy data for each generated event confirmation data set, the predetermining positional relationship providing information on the identity of the target data in the event confirmation data set to the user;
      receive a user response to an authentication prompt; and
      compare the authentication result and the user response and authenticating the event if the authentication result and user response are the same;

wherein, based upon a predetermined event, the set of instructions further cause the processor to generate a second authentication data set, generate an authentication query set, or discontinue a login session with the user;

wherein generating an authentication query set comprises:

a plurality of predetermined decoy queries, wherein each of the predetermined decoy queries is based on information from the user profile; and at least one predetermined target query, wherein each target query is from the user profile;

present the authentication query set on at least one terminal;

determine an authentication result by retrieving a correct response to each target query from the user profile;

receive a user response to an authentication prompt; and compare the authentication result and the user response and authenticating the user if the authentication result and user response are the same;

wherein the decoy queries and target query are presented in random relationship relative to one another.

15. The authentication system of claim 14 wherein the event confirmation data set comprises at least two target data.

16. The authentication system of claim 15 wherein the predetermined manipulation includes transposing the at least two target data.

17. The authentication system of claim 14 wherein the predetermined manipulation is a mathematical function.

18. The authentication system of claim 14 wherein the instructions further cause the processor to embed the event confirmation data set in a digital image.

19. A computer program product, comprising a computer usable non-transitory medium having a computer readable program code embodied therein, said computer readable program code adapted to be executed to implement a method for authenticating a user, said method comprising:

receiving user login information, wherein the user login information corresponds to a user profile;

generating an authentication data set comprising:

a plurality of decoy data;

an anchor data, wherein the anchor data is based on information from the user profile; and at least one target data in a predetermined positional relationship relative to the anchor data, wherein the predetermined relationship is based on information from the user profile;

generating a decoy data set comprising:

a plurality of second decoy data; and at least one anchor data, wherein the anchor data is based on information from the user profile;

presenting the authentication data set and decoy data set to the user;

wherein the anchor data and the target data are positioned differently and randomly among the decoy data for each generated authentication data set, the predetermining positional relationship providing information on the identity of the target data in the authentication data set to the user;

determining an authentication result by performing a predetermined manipulation of the at least one target data, wherein the predetermined manipulation is based on information from the user profile;

receiving a user response to an authentication prompt; and comparing the authentication result and the user response and authenticating the user if the authentication result and user response are the same;

wherein, based upon a predetermined event, the set of instructions further cause the processor to generate a second authentication data set, generate an authentication query set, or discontinue a login session with user;

wherein generating an authentication query set comprises:

a plurality of predetermined decoy queries, wherein each of the predetermined decoy queries is based on information from the user profile; and at least one predetermined target query, wherein each target query is from the user profile;

present the authentication query set on at least one terminal;

determine an authentication result by retrieving a correct response to each target query from the user profile;

receive a user response to an authentication prompt; and compare the authentication result and the user response and authenticating the user if the authentication result and user response are the same;

wherein the decoy queries and target query are presented in random relationship relative to one another.

* * * * *